UNITED STATES PATENT OFFICE.

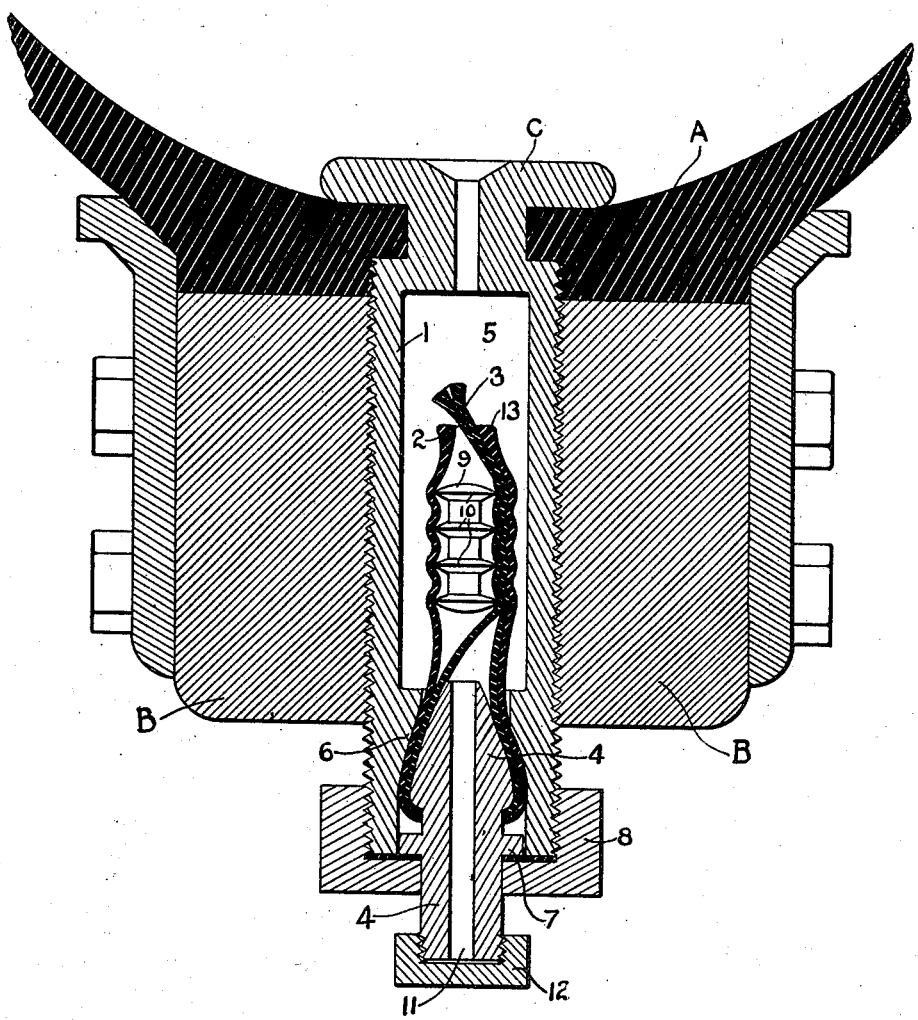

ALBAN HOTTENROTH, OF BERLIN, GERMANY, ASSIGNOR TO GENERAL ELECTRIC COMPANY, A CORPORATION OF NEW YORK.

AIR-VALVE.

1,045,404.     Specification of Letters Patent.     Patented Nov. 26, 1912.

Application filed December 23, 1904. Serial No. 238,069.

*To all whom it may concern:*

Be it known that I, ALBAN HOTTENROTH, a subject of the King of Saxony, Germany, residing at Berlin, Germany, have invented certain new and useful Improvements in Air-Valves, of which the following is a specification.

The present invention relates to valve mechanism and particularly to mechanism of the check valve type, such as used in connection with vehicle tires for the purpose of enabling them to be inflated.

Considerable difficulty is experienced in producing an efficient air-tight valve for use in connection with vehicle tires or in similar situations, and at the same time a simple and compact construction having but few parts which are not likely to get out of order and which will operate in a uniform manner and for a comparatively long period. It is usual in the simplest forms to employ an ordinary check valve with a rubber packing, but this is objectionable since, if the pressure is comparatively great, the valve is apt to be forced against its seat with sufficient pressure to cause it to stick and the rubber packing is caused to rapidly deteriorate in effectiveness.

The object of the present invention is to produce a simple and compact valve of the character described so arranged as to be efficient in operation and of great durability.

A further object of the present invention is to produce a valve of the character specified in which pressure upon the yielding engaging surfaces of the valve proper is reduced to a minimum.

Further objects of the present invention will appear in connection with the following description of one embodiment thereof which is illustrated in the accompanying drawing which represents in cross-section one of the improved valve mechanisms arranged in position upon the tire of the vehicle.

Similar reference characters will be used throughout the specification and drawing to indicate like parts.

A indicates a tire mounted upon a rim B, these parts being of course of any desired construction since they form no part of the present invention and, since, furthermore, the valve mechanism may be employed equally well in other situations. The valve mechanism C consists of a casing 1 arranged to be suitably attached at one end to the tire A and of sufficient length to extend entirely through the rim B. The valve proper comprises two tubes 2 and 3, one or both of which consists of rubber or a similar elastic material, these tubes being arranged one within the other. One end of the double tube formed by the superimposed tubes 2 and 3 is expanded upon a nipple 4, and the other end of the tube extends into the chamber 5 of the casing 1. The nipple 4 is cone-shaped, and together with the superimposed tubes, engages with a cone-shaped socket 6 in the end of the casing; whereby, when the parts are placed in position, the outer end of the double tube is firmly held in place. The nipple 4 is provided with a shoulder 7 which engages with a nut 8 screw-threaded upon the casing 1; this nut serving to maintain the parts in their operative positions. Within the outer tube 2 there is arranged a plug 9 which is preferably loose and provided with a series of annular ribs 10. The diameter of these ribs is such that, when the plug is in position, the tube 3 is collapsed and forced against one side of the inclosing tube 2, as shown, and at the same time the collapsed tube and the walls of the inclosing tube are corrugated. A passage or channel 11 extends through the nipple and it is through this passage fluid is introduced into the chamber 5 and thence into the tire. In operation the cap is removed from the end of the nipple and the pump or other source of compressed fluid supply is screwed or otherwise fastened to the nipple. The fluid passes through the passage or channel 11 into the double tube and, when the pressure is sufficient, causes the inner tube 3 to open slightly to permit the passage of the fluid through the tube and out of the inner end thereof to the chamber 5. When the pressure in the channel 11 is reduced the tube 3 immediately collapses to the position shown, either by reason of its own elasticity or by reason of the elasticity of the inclosing tube 2; thereby effectually preventing the fluid from again leaving the chamber 5.

It is not necessary that plug 9 be ribbed as shown, but it is preferably provided with, at least, one rather narrow edge which permits the formation of a perfectly tight closure in the collapsed tube without the employment of very much force, since the narrow edge produces a corresponding bend in the tube.

By employing a series of ribs or projections the inner tube is held closed at a number of points and consequently the diameter of the plug may be considerably reduced, thereby decreasing the pressure at any one point and avoiding the necessity of stretching the material of the tubes very much. It is evident that the less the strain upon the tubes the longer the life thereof will be.

Although the fixed ends of the tubes 2 and 3 are illustrated as secured in place by means of a nipple 4, it is of course evident that the particular fastening means employed may be greatly varied. Furthermore, if desired, the free end of the tube may be provided with a thickened portion or reinforcement 13, which prevents the plug 9 from being accidentally discharged from the end of the tube. Many other modifications may likewise be made without departing from the spirit and scope of the invention as set forth in the appended claims.

What I claim as new and desire to secure by Letters Patent of the United States, is:

1. A valve comprising a pair of elastic tubes arranged one within the other, and means for pressing the inner tube against one side of the outer tube.

2. A valve comprising a pair of elastic tubes arranged one within the other, and means interposed between the tubes for holding a portion of the inner tube normally collapsed and pressing it against the interior of the outer tube.

3. A valve comprising a pair of elastic tubes arranged one within the other, and means for collapsing the inner tube against the interior of the outer tube.

4. A valve comprising a pair of tubes arranged one within the other, the outer tube being elastic, and means for collapsing the inner tube against the interior of the outer tube.

5. A valve having in combination a tube, an elastic inclosing tube, and means for collapsing the inner tube against the inclosing tube.

6. A valve having in combination, a tube, an elastic inclosing tube, and means arranged between the walls of the tube for collapsing the inner tube against the interior of the inclosing tube.

7. A valve having in combination, a tube, an elastic inclosing tube, and means for collapsing the inner tube against the interior of the inclosing tube and forming a bend in the collapsed inner tube at the point of engagement between it and the inclosing tube.

8. A valve comprising a tube, an elastic inclosing tube, and means contained within said inclosing tube for collapsing the inner tube against the interior of the inclosing tube.

9. A valve comprising a tube, an elastic inclosing tube, and means contained within said inclosing tube for collapsing the inner tube against the inclosing tube and forming a bend in said inner tube and in the wall of the inclosing tube.

10. A valve comprising a pair of tubes arranged one within the other and a plug located between the two tubes, the cross-sectional area of the plug, together with the cross-sectional area of the walls of the inner tube being equal to or greater than the interior cross sectional area of the outer tube.

11. A valve comprising a pair of tubes arranged one within the other and a plug located between the two tubes, said plug having a series of projections adapted when the plug is in position to collapse the inner tube and press it as a series of points against the outer tube.

12. A valve comprising a pair of tubes arranged one within the other, and a plug loosely arranged within the outer tube and adapted to collapse the inner tube against the interior of the outer tube.

13. A valve comprising a tube, a member having a plurality of transverse ribs, and means for collapsing said tube and forcing it against said ribs.

14. A valve comprising a tube, a member having a plurality of ribs, and means for collapsing said tube and holding it yieldingly against said member with the ribs extending transversely of the tube.

In witness whereof I have hereunto set my hand this sixth day of December, 1904.

ALBAN HOTTENROTH.

Witnesses:
HENRY HASPER,
WOLDEMAR HAUPT.